UNITED STATES PATENT OFFICE.

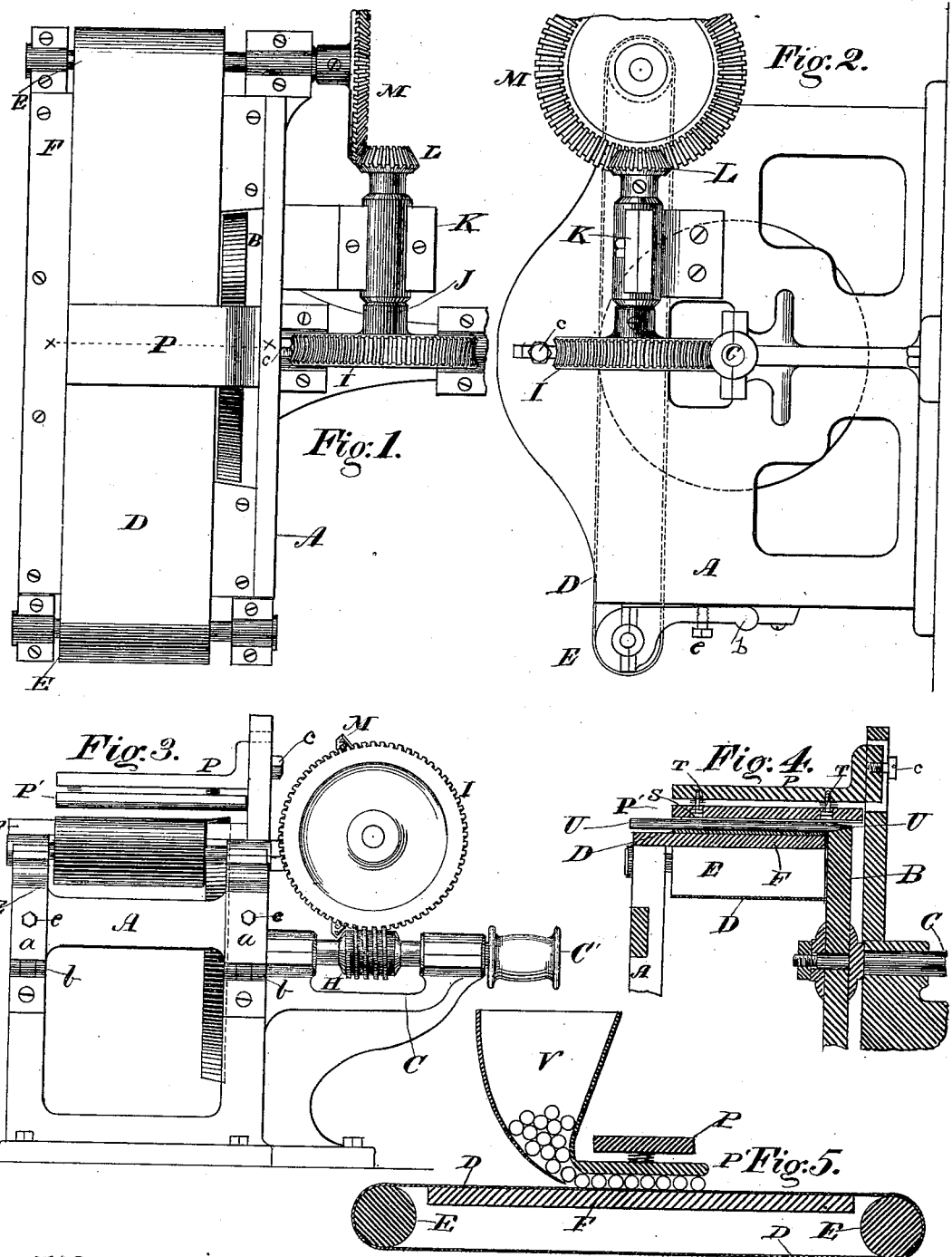

BENNETT WILLIAMS, OF BOSTON, MASSACHUSETTS, ASSIGNOR TO HIMSELF AND WILLIAM J. GRIFFITHS, OF SAME PLACE.

PENCIL-SHARPENING MACHINE.

SPECIFICATION forming part of Letters Patent No. 282,823, dated August 7, 1883.

Application filed December 14, 1882. (No model.)

*To all whom it may concern:*

Be it known that I, BENNETT WILLIAMS, of Boston, in the county of Suffolk and State of Massachusetts, have invented certain Improvements in Pencil-Sharpening Machines, of which the following is a specification.

This invention has for its object to provide a machine adapted to sharpen slate and other pencils effectively and rapidly; and it consists, as a whole, in an organized machine having a rapidly-rotated bevel-edged abrading or grinding wheel, of emery or other suitable material, and means for presenting the ends of a pencil to the beveled periphery of the said wheel and rotating the pencil while it is being presented, said means consisting of an endless slowly-driven belt on which the pencils to be sharpened are laid, a rigid support under said belt to prevent it from yielding at the point where the pencils are presented to the grinding-wheel, and a pad or block having a slightly-yielding surface adapted to bear with a yielding pressure on the pencils supported by the belt and cause the pencils to rotate as they are moved by the belt, said pad or block being affixed to the frame of the machine.

Of the accompanying drawings, forming a part of this specification, Figure 1 represents a top view of a pencil-sharpening machine embodying my invention. Fig. 2 represents a rear elevation of the same. Fig. 3 represents an end elevation. Fig. 4 represents a section on line *x x*, Fig. 1. Fig. 5 represents a longitudinal section of the carrying-belt and its pressure-pad, showing a hopper for feeding pencils to the belt.

The same letters of reference indicate the same parts in all the figures.

In the drawings, A represents the general frame-work of the machine, supporting the parts hereinafter described.

B represents the grinding-wheel, which may be of emery or any suitable abrasive material, and is beveled on its periphery, as shown. The grinding-wheel is mounted on an arbor, C, which is journaled in bearings on the frame of the machine and provided with a pulley, C', to receive a driving-belt in case the machine is to be driven by power. When driven by hand the arbor C may have a suitable crank.

D represents the pencil-feeding belt placed upon pulleys E E, at the opposite ends of the machine, and supported at its upper portion between said belts by a fixed flat table, F, placed under the upper portion of the belt, and adapted to prevent the belt from yielding at the point where the pencils resting thereon are presented to the grinding-wheel. The belt is driven slowly by any suitable means, preferably by a connection between the arbor C of the grinding-wheel and one of the pulleys E. In the present instance I have shown the arbor C provided with a worm, H, engaging with a worm-wheel, I, on an arbor, J, which is journaled in a bracket, K, on the frame A, and has a bevel-pinion, L, meshing with a bevel pinion or wheel, M, of considerably larger diameter on the arbor of one of the pulleys E. This connection, it will be observed, causes the pulley E to rotate at a much slower rate than the arbor C, and to drive the belt at a correspondingly slow rate.

P represents an arm or bracket rigidly attached to the frame A, and projecting over the part of the belt that is supported by the fixed table F. The arm P supports a pad or block, P', which is preferably a piece of wood or metal covered on its under surface with leather or other soft or yielding material. The pad P' is preferably connected to the bracket P in such manner that it can have a limited upwardly-yielding movement against a downward spring-pressure. Such connection is afforded in the present instance by headed studs S S, secured to the bracket P and passing through orifices in the pad P', the latter being recessed above its leather covering to receive the heads of said studs. Springs T T are interposed between the bracket and pad, and press the latter downwardly to a bearing on the heads of the studs S. The under surface of the pad P' is substantially parallel with the upper surface of the belt D, and the pad is normally held in close proximity to the belt, but is adapted to yield sufficiently to admit a pencil, U, between the pad and belt.

It will be seen that a pencil placed transversely of the belt and between the latter and the pad P' will be carried along slowly by the movement of the belt, and will at the same time be caused to rotate by the pressure of the non-moving pad. The belt and pad are so arranged that the laterally moving and rotating pencil will be presented at one end to the beveled periphery of the grinding-wheel, as shown in Fig. 4, and will be pointed thereby.

It is obvious that a number of pencils can be laid side by side upon the belt and moved simultaneously thereby under the pad. If desired, a hopper or receiver, V, may be employed, adapted to hold a quantity of pencils and to permit them to drop one at a time upon the belt at the front edge of the pad, as shown in Fig. 5.

One of the pulleys E may be journaled in movable boxes on arms $a\ a$, hinged at $b\ b$ to the frame of the machine, and provided with screws $e\ e$, bearing against the frame A, and adapted to press the arms $a\ a$ away from said frame to tighten the belt D.

The soft surface and yielding nature of the pad P' enable it to act on pencils of different sizes, and also to exert sufficient pressure on the pencils to properly rotate the same without danger of breaking the pencils, the latter, when made of slate, being of a brittle nature.

The pad P' is made vertically adjustable, to adapt it to a greater variety of sizes of pencils. To this end the bracket P is provided with vertical slots, through which pass the screws $c$, that attach the bracket to the frame.

I claim—

1. In a pencil-sharpening machine, the combination of a bevel-edged grinding or abrading wheel adapted to be rapidly rotated, an endless carrying-belt passing over suitable supporting-pulleys, means for slowly rotating said pulleys, a fixed support or table under the upper portion of the belt adjacent to the grinding-wheel, and a yielding soft-surfaced pad or block immovable in the direction of movement of the belt, and adapted to exert a yielding pressure on one or more pencils, supported on the belt over said fixed support, and cause said pencils to rotate, said pad or block being adapted by its soft and yielding nature to act on different sizes of pencils and exert a sufficient pressure on the pencils without danger of breaking them, as set forth.

2. The combination, with the bevel-edged grinding-wheel, of the carrying-belt, its fixed support, the yielding pad or block, and a supporting-arm for said pad or block, said arm being vertically adjustable, and provided with means for positively holding it in any position to which it may be adjusted, as set forth.

In testimony whereof I have signed my name to this specification, in the presence of two subscribing witnesses, this 11th day of December, 1882.

BENNETT WILLIAMS.

Witnesses:
C. F. BROWN,
A. L. WHITE.